United States Patent
Umezawa et al.

(10) Patent No.: US 6,661,532 B2
(45) Date of Patent: *Dec. 9, 2003

(54) PRINTING APPARATUS

(75) Inventors: Masahiko Umezawa, Kawasaki (JP); Hiroshi Fukui, Yokosuka (JP); Shinichi Omo, Kawasaki (JP); Akira Kuronuma, Kawasaki (JP); Takayuki Murata, Kawasaki (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/767,803

(22) Filed: Dec. 17, 1996

(65) Prior Publication Data

US 2002/0048045 A1 Apr. 25, 2002

(30) Foreign Application Priority Data

Dec. 21, 1995 (JP) ............................................. 7-333629

(51) Int. Cl.[7] ................ B41J 2/36; G06K 1/00
(52) U.S. Cl. .................. 358/1.16; 358/1.8; 347/195; 347/211
(58) Field of Search .................. 395/108, 115; 347/5, 19, 211, 217, 193, 195; 358/1.16, 1.15, 1.8, 443

(56) References Cited

U.S. PATENT DOCUMENTS

| | | | |
|---|---|---|---|
| 4,313,124 A | 1/1982 | Hara | |
| 4,345,262 A | 8/1982 | Shirato et al. | |
| 4,459,600 A | 7/1984 | Sato et al. | |
| 4,463,359 A | 7/1984 | Ayata et al. | |
| 4,558,333 A | 12/1985 | Sugitani et al. | |
| 4,567,570 A | 1/1986 | Peer | |
| 4,608,577 A | 8/1986 | Hori | |
| 4,723,129 A | 2/1988 | End et al. | |
| 4,740,796 A | 4/1988 | Endo et al. | |
| 5,049,898 A | * 9/1991 | Arthur et al. | 347/19 |
| 5,122,816 A | * 6/1992 | Poeppel | 347/211 |
| 5,455,608 A | * 10/1995 | Stewart et al. | 347/23 |
| 5,467,437 A | * 11/1995 | Fuse | 395/115 |
| 5,548,688 A | * 8/1996 | Wiklof et al. | 358/1.8 |
| 5,608,442 A | * 3/1997 | Bennefeld et al. | 347/211 |
| 5,623,297 A | * 4/1997 | Austin et al. | 347/194 |
| 5,625,399 A | * 4/1997 | Wiklof et al. | 347/195 |
| 5,661,514 A | * 8/1997 | Lukis et al. | 347/211 |

(List continued on next page.)

FOREIGN PATENT DOCUMENTS

| | | |
|---|---|---|
| EP | 0 310 217 | 4/1989 |
| JP | 54-56847 | 5/1979 |
| JP | 59-123670 | 7/1984 |
| JP | 59-138461 | 8/1984 |
| JP | 60-71260 | 4/1985 |
| JP | 6-24003 | 2/1994 |
| JP | 6-122199 | 5/1994 |
| JP | 7-242028 | 9/1995 |

Primary Examiner—Edward Coles
Assistant Examiner—Joseph R. Pokrzywa
(74) Attorney, Agent, or Firm—Fitzpatrick, Cella, Harper & Scinto

(57) ABSTRACT

A printer, which enables complicated printhead controls without a complicated logic circuit, includes a data table showing a control pattern of six controls stored in a RAM. When a drive trigger is inputted into a read-trigger generator, an address generator generates the address of the data table in the RAM as an address signal and inputs the address signal into the RAM. On the other hand, the read-trigger generator inputs a data-read trigger into the RAM. Control signals read by these signals are inputted into a head driver with heat pulses, which drives the printhead.

25 Claims, 10 Drawing Sheets

U.S. PATENT DOCUMENTS

| | | | | |
|---|---|---|---|---|
| 5,675,370 A | * | 10/1997 | Austin et al. | 347/188 |
| 5,687,297 A | * | 11/1997 | Coonan et al. | 358/1.2 |
| 5,742,305 A | * | 4/1998 | Hackleman | 347/42 |
| 5,765,953 A | * | 6/1998 | Takahashi | 400/120.09 |
| 5,790,140 A | * | 8/1998 | Koizumi et al. | 347/12 |
| 5,847,729 A | * | 12/1998 | Takahashi et al. | 347/43 |
| 5,892,532 A | * | 4/1999 | Katakura et al. | 347/240 |
| 6,023,284 A | * | 2/2000 | Rogers et al. | 347/217 |

* cited by examiner

FIG. 6

| READ ADDRESS (DECIMAL REPRESENTATION) | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 |
|---|---|---|---|---|---|---|---|---|---|---|---|---|---|---|---|---|---|---|---|---|---|---|---|---|---|---|---|---|---|---|---|---|---|---|---|
| COM11 | 0 | 0 | 0 | 0 | 1 | 1 | 1 | 1 | 0 | 0 | 0 | 0 | 1 | 1 | 1 | 1 | 0 | 0 | 0 | 0 | 0 | 1 | 1 | 1 | 0 | 0 | 0 | 0 | 0 | 1 | 1 | 1 | 1 | 0 | 0 |
| COM12 | 0 | 0 | 0 | 0 | 0 | 0 | 0 | 1 | 1 | 1 | 1 | 1 | 1 | 1 | 1 | 1 | 0 | 0 | 0 | 0 | 0 | 0 | 0 | 0 | 1 | 1 | 1 | 1 | 1 | 1 | 1 | 1 | 0 | 0 | 0 |
| COM21 | 0 | 0 | 0 | 0 | 0 | 0 | 1 | 1 | 1 | 0 | 0 | 0 | 0 | 0 | 1 | 1 | 1 | 1 | 1 | 0 | 0 | 0 | 0 | 1 | 0 | 0 | 0 | 0 | 0 | 0 | 0 | 0 | 0 | 0 | 0 |
| COM22 | 0 | 0 | 0 | 1 | 1 | 1 | 1 | 1 | 1 | 1 | 1 | 1 | 1 | 1 | 1 | 1 | 0 | 0 | 0 | 0 | 0 | 0 | 0 | 0 | 0 | 1 | 1 | 1 | 1 | 1 | 1 | 1 | 1 | 1 | 0 |
| UPPER ENABLE | 1 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| LOWER ENABLE | 0 | 0 | 0 | 0 | 0 | 0 | 0 | 0 | 0 | 0 | 0 | 0 | 0 | 0 | 0 | 0 | 0 | 0 | 1 | 1 | 1 | 1 | 1 | 1 | 1 | 1 | 1 | 1 | 1 | 1 | 1 | 1 | 0 | 1 | 0 |

F I G. 8

| READ ADDRESS (DECIMAL REPRESENTATION) | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|
| COM11 | 1 | 0 | 0 | 1 | 0 | 0 | 0 | 0 | 1 | 0 | 0 | 1 | 0 | 0 | 0 | 0 | 0 | 0 | 0 |
| COM12 | 1 | 0 | 0 | 1 | 1 | 0 | 0 | 1 | 0 | 0 | 0 | 0 | 0 | 0 | 0 | 0 | 0 | 0 | 0 |
| COM21 | 0 | 0 | 1 | 0 | 0 | 1 | 0 | 0 | 0 | 0 | 1 | 0 | 0 | 1 | 0 | 0 | 0 | 0 | 0 |
| COM22 | 0 | 0 | 1 | 0 | 0 | 1 | 1 | 0 | 0 | 1 | 0 | 0 | 0 | 0 | 0 | 0 | 0 | 0 | 0 |
| UPPER ENABLE | 1 | 0 | 1 | 1 | 1 | 1 | 1 | 1 | 1 | 1 | 1 | 1 | 1 | 1 | 1 | 1 | 0 | 1 | 0 |
| LOWER ENABLE | 1 | 0 | 1 | 1 | 1 | 1 | 1 | 1 | 1 | 1 | 1 | 1 | 1 | 1 | 1 | 1 | 0 | 1 | 0 |

PRINTING APPARATUS

BACKGROUND OF THE INVENTION

This invention relates to a printing apparatus and, more particularly to a printing apparatus having a printhead which performs printing in accordance with an ink-jet printing method.

A conventional printer having a plurality of print modes employs gate circuits to obtain selection pulses to select print elements as parts of a printhead for printing in accordance with one of the print modes.

FIG. 10 is a block diagram showing selection-pulse generators of the conventional printer having two print modes. When a drive trigger indicating the start of printing is inputted from a controller (not shown) of the printer a selector 80 selects one of two selection-pulse generators 81. The selector 80 operates in accordance with a print-mode signal similarly inputted from the controller. Next, the selected selection-pulse generator outputs six signals COM11, COM12, COM21, COM22, UPPER ENABLE and LOWER ENABLE, to a head driver 83, at a predetermined period. On the other hand, a heat-pulse generator 82 generates a heat pulse based on a control signal (not shown) inputted via an address bus and a data bus provided in the controller, and also outputs the heat pulse to the head driver 83. The head driver 83 drives a printhead 84 based on these input signals.

Recently, print speed has become increasingly higher, and high-speed printing using a printhead having a large number of print elements (e.g., heaters or ink-discharge nozzles) has been proposed. However, with increase of the number of print elements, complicated printhead controls such as interlaced drive and/or print controls in accordance with a plurality of print modes are required. In consideration of requirements such as apparatus downsizing, cutting costs and high-speed printing, it is difficult to implement such complicated controls with gate circuits.

SUMMARY OF THE INVENTION

Accordingly, it is an object of the present invention to provide a printing apparatus and print-control method which enables complicated printhead control without a complicated logic circuit.

According to one aspect of the present invention, the foregoing object is attained by providing a printer for printing an image on a printing medium by using a printhead including a plurality of print elements, comprising: selection means for selecting print elements from the plurality of print elements; memory means for storing a selection pattern used by the selection means; and selection control means for controlling the selection means so as to read the selection pattern stored in the memory means and select the print elements from the plurality of print elements, in accordance with the read selection pattern.

According to another aspect of the present invention, the foregoing object is attained by providing a print control method of controlling print operation to print an image on a print medium by using a printhead including a plurality of print elements, comprising: a reading step of reading a selection pattern from a storage medium; and a selection step of selecting print elements from the plurality of print elements, based on the read selection pattern.

In accordance with the present invention as described above, for selecting print elements to perform print operation using a plurality of print elements, a selection pattern related to the selection is stored in the memory means, then the stored selection pattern is read, and the selection is performed based on the read selection pattern. The selected print elements are driven for printing.

Note that the selection pattern stored in the memory means is rewritable. The memory means includes a RAM.

Then, a new selection pattern and an address of the memory means for storing the new selection pattern are inputted from an external device. The selection pattern stored in the memory means may be rewritten based on the input new selection pattern and the corresponding address.

The selection pattern may be stored in the memory means in the form of a table.

On the other hand, the control means issues a trigger signal to start a print operation. Upon inputting the trigger signal, an address of the memory means where the selection pattern is stored is generated, and a read trigger signal is generated for reading the selection pattern from the memory means. Upon inputting the trigger signal, a head address of the selection pattern is generated, thereafter, in synchronization with the generation of the read trigger signal, the address is incremented by one. The selection pattern is sequentially read by the increment of the address. When the print operation corresponding to all the print elements has been completed, the address is reset.

Note that the printhead may be an ink-jet printhead which performs printing by discharging ink, or a printhead which discharges ink by utilizing thermal energy. The latter printhead may have thermal-energy generators for generating thermal energy to be provided to the ink.

The printhead may be a color printhead. In this case, the printhead comprises a first printhead unit for discharging yellow ink, a second printhead unit for discharging cyan ink, a third printhead unit for discharging magenta ink, and a fourth printhead unit for discharging black ink.

The invention is particularly advantageous since various complicated print controls can be performed without complicated logic circuit.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6 is a table containing data indicating status change of the control signals in FIG. 5;

FIG. 8 is a table containing data indicating status change of the control signals in FIG. 7;

DETAILED DESCRIPTION OF THE PREFERRED EMBODIMENTS

Preferred embodiments of the present invention will now be described in detail in accordance with the accompanying drawings.

Figure 1:
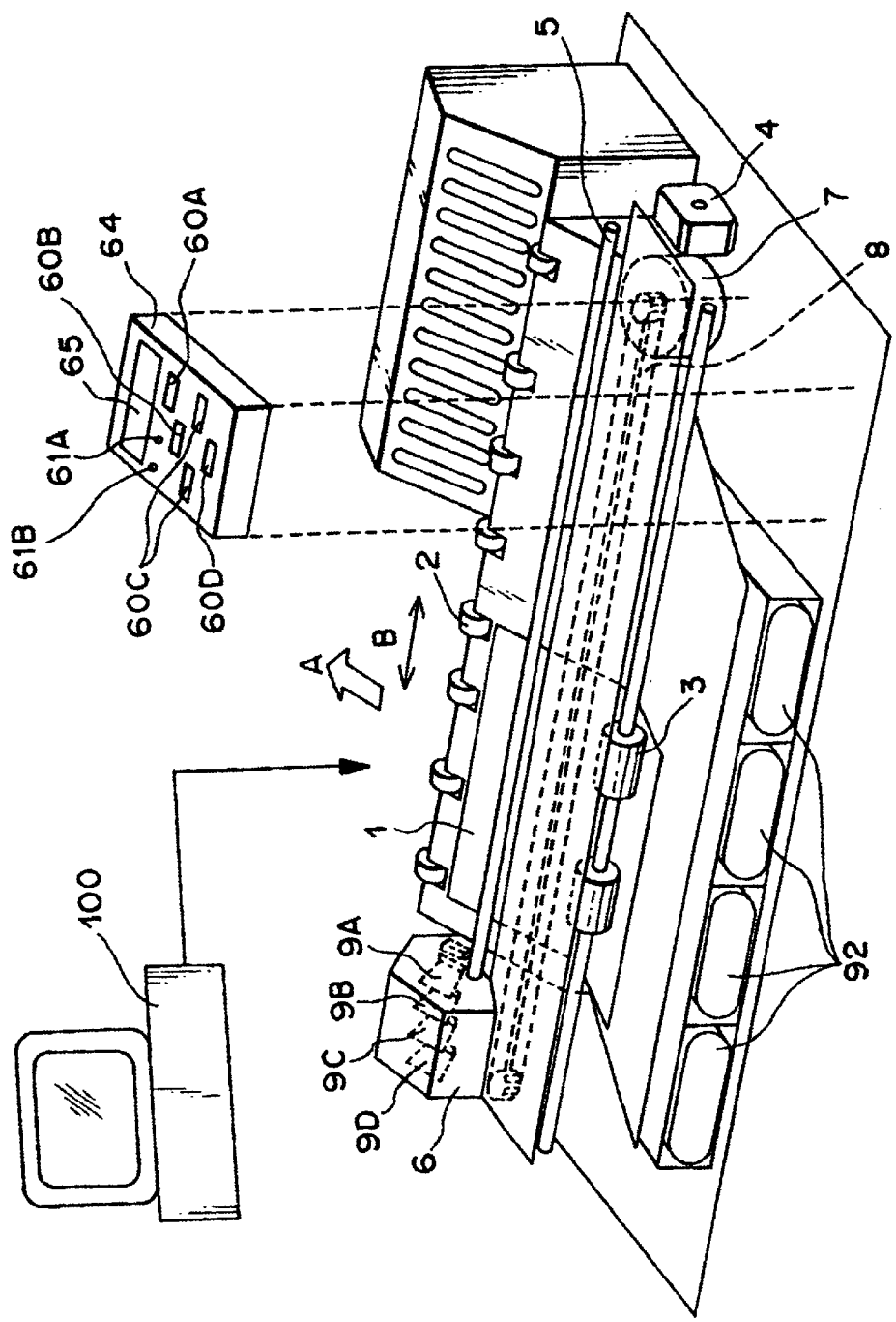
FIG. 1 is a perspective view showing the structure of a printer having a printhead which performs printing in accordance with an ink-jet print method, as a typical embodiment of the present invention.

FIG. 1 is a perspective view showing the structure of a printer having a printhead which performs printing in accordance with an ink-jet print method, as a typical embodiment of the present invention.

In FIG. 1, reference numeral 1 denotes a print sheet (or a recording medium such as a plastic sheet); 2 and 3, conveyance rollers, provided above and below a print area of the print sheet 1, for conveying the print sheet 1 in the arrow A direction; 4, a paper-feed motor for driving the conveyance rollers 2 and 3; 5, a guide shaft provided between the conveyance rollers 2 and 3, in parallel to a rotational axis of the conveyance rollers 2 and 3; 6, a carriage which scan-moves (in the arrow B direction) along the guide shaft 5; 7, a carriage motor for driving the carriage 6; and 8, a belt for transmitting drive force from the carriage motor 7 to the carriage 6.

The carriage 6 holds printheads 9A to 9D (or generally referred to as a "printhead 9") which discharge ink droplets in accordance with an ink-jet printing method. The printheads 9A to 9D, for color image printing, are respectively provided along the scan-moving direction of the carriage 6. The printhead 9A is a K head corresponding to black (Bk) ink; the printhead 9B, a C head corresponding to cyan (C) color ink; the printhead 9C, an M head corresponding to magenta (M) color ink; and the printhead 9D, a Y head corresponding to yellow (Y) color ink. The front surface of each printheads 9A to 9D, i.e., a surface opposing to a print surface of the print sheet 1, with a predetermined interval, has a plurality (e.g., 64 or 128) of ink-discharge orifices aligned in a direction diagonal to the scan-moving direction of the carriage 6. The printheads 9A to 9D have logic circuits of the same construction.

On an operation panel 64 attached to a housing case (not shown) of the printer, setting keys such as an online/offline switching key 60A, a line-feed key 60B, a print-mode switching key 60C and a reset key 60D, LED lamps such as an alarm lamp 61A and a power lamp 61B, and an LCD 65 for displaying various messages are provided.

Note that numeral 92 denotes an ink tank containing ink to be used for printing an image on the print sheet 1. The ink tank 92 comprises four compartments for containing four color (cyan (C), magenta (M), yellow (Y) and black (Bk)) inks corresponding to the four printheads 9A to 9D.

As it will be described in detail below, a controller, including a CPU of the printer, a ROM, a RAM and the like, receives command signals and data signals (print information) from a host computer (hereinafter referred to as a "host") 100. Based on the received information, the controller drives the respective motors and the like, and sends an electric current, which works as driving power (heat power), to the electrothermal transducers (heaters) included in the printheads 9A to 9D.

Figure 2:
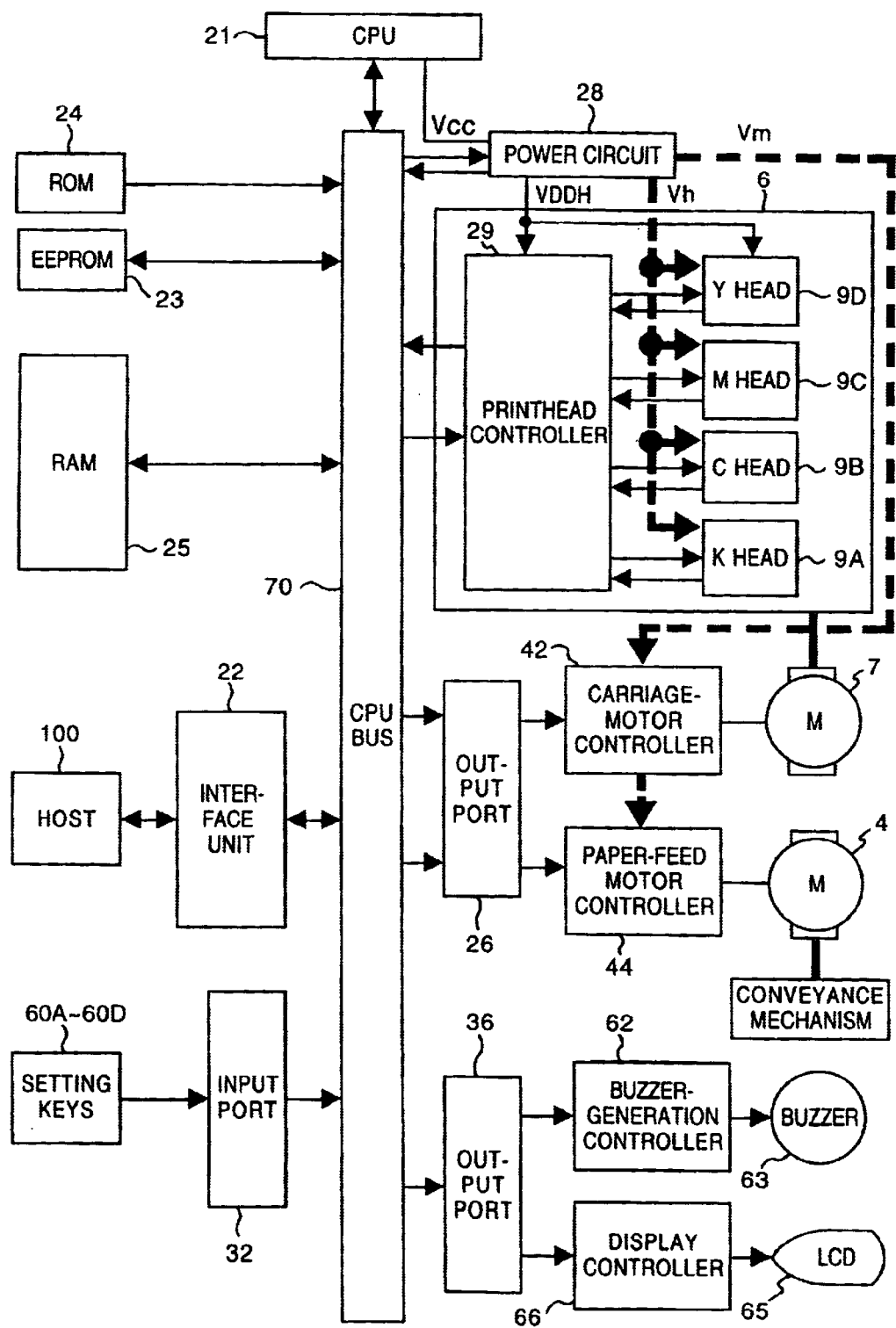
FIG. 2 is a block diagram showing the schematic construction of a controller of the printer in FIG. 1.

FIG. 2 is a block diagram showing the schematic construction of the controller of the printer in FIG. 1.

In FIG. 2, numeral 21 denotes a CPU configured as a microprocessor. The CPU 21 is connected to the host 100 via an interface unit 22. The CPU 21 accesses a ROM 24 in which control programs are stored, an EEPROM 23 in which updateable control programs, processing programs and various constant data are stored, and a RAM 25 for storing command signals and print information signals received from the host 100 via the interface unit 22, and controls print operation based on the information stored in these memories. Further, the CPU 21 drives the carriage motor 7 via an output port 26 and a carriage-motor controller 42 to move the carriage 6, and/or drives the paper-feed motor 4 via the output port 26 and a paper-feed motor controller 44 to operate the conveyance mechanism such as the conveyance rollers 2 and 3. Furthermore, the CPU 21 drives the printheads 9A and 9D via a printhead controller 29 based on print information stored in the RAM 25, thus printing a desired image on the print sheet 1.

Numeral 28 denotes a power circuit which outputs a logic drive voltage Vcc (e.g., 5 V) to drive the CPU 21, motor-drive voltages Vm (e.g., 30 V) for the respective motors, a heat voltage Vh (e.g., 25 V) to drive the printhead 9, and a backup voltage VDDH for backup of the printhead 9. The heat voltage Vh is applied to the printhead 9, and the backup voltage VDDH is applied to the printhead controller 29 and the printhead 9.

Instructions inputted with the operation keys 60A to 60D are transferred to the CPU 21 via an input port 32. As a command from the CPU 21 is transferred to a buzzer-generation controller 62 via an output port 36, a buzzer 63 emits buzz sound. Otherwise, as a command from the CPU 21 is transferred to a display controller 66, a message is displayed on the LCD 65.

Note that in FIG. 2, numeral 70 denotes a CPU bus interconnecting the respective elements.

Figure 3:
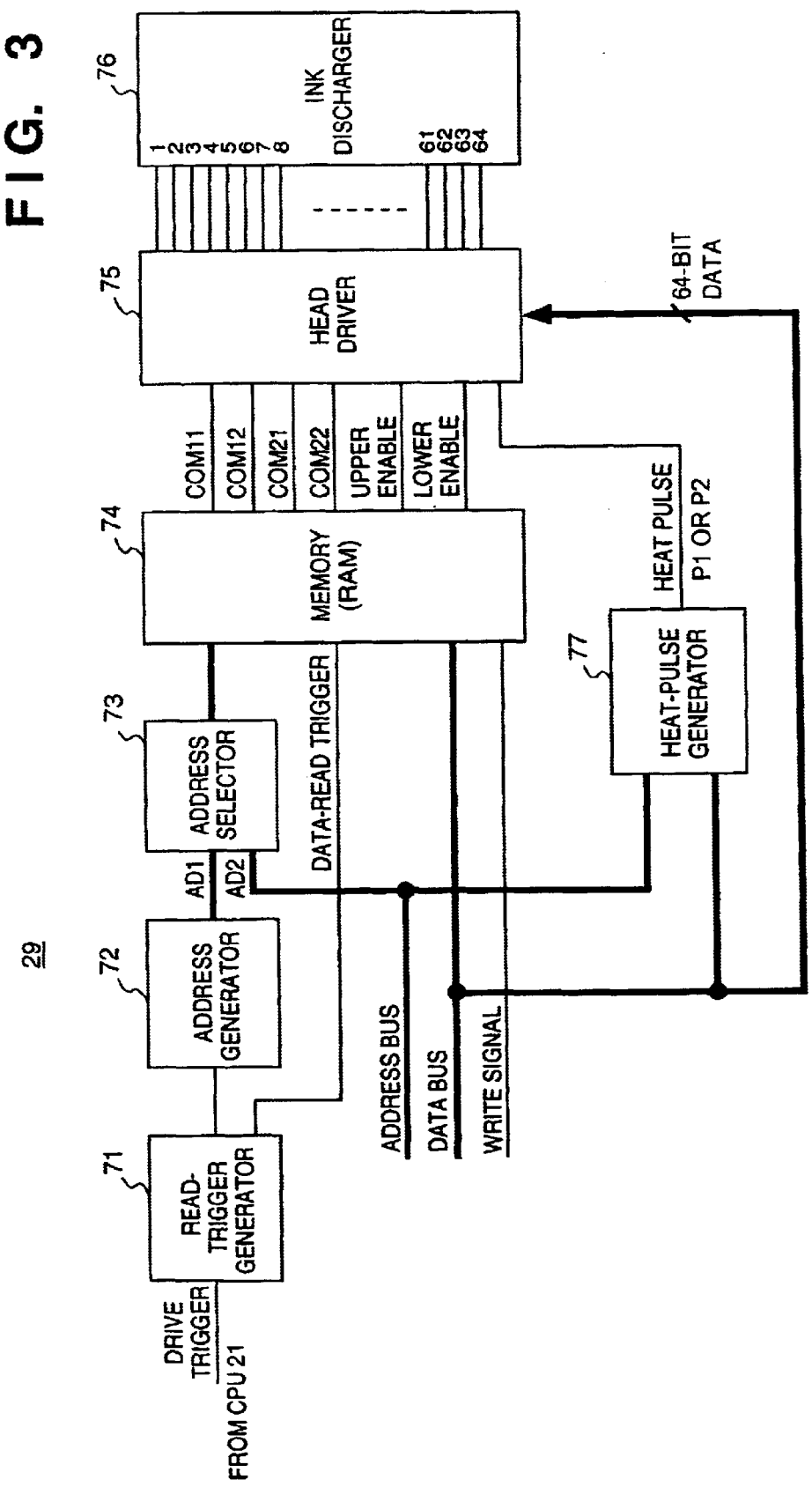
FIG. 3 is a block diagram showing the detailed construction of a printhead controller 29.

FIG. 3 is a block diagram showing the detailed construction of a printhead controller 29.

In FIG. 3, numeral 71 denotes a read-trigger generator which generates a data-read trigger signal a predetermined number of times, by a drive trigger from the CPU 21; 72, an address generator which generates an address signal AD1 by an output signal from the read-trigger generator 71; 73, an address selector (SEL) which selects one of the address signal AD1 outputted from the address generator 72 and an address signal AD2 outputted from an address bus as a part of the CPU bus 70; 74, a memory (RAM) for storing a control pattern to be described later for controlling the printhead 9; 75, a head driver integrated in the printhead 9; 76, an ink discharger integrated in the printhead 9; and 77, a heat-pulse generator which generates a heat pulse (P1 or P2) in accordance with signals from the address bus and a data bus, and supplies the heat pulse to a head driver 75.

When the data-read trigger signal is supplied, control signals COM11, COM12, COM21, COM22, UPPER ENABLE and LOWER ENABLE are read from the RAM 74, in accordance with an address indicated by a read address (address signal AD1 or AD2). The read control signals are outputted to the head driver 75. The contents of the RAM 74 are written or rewritten by a write signal supplied from the CPU 21 and an address and data inputted with the write signal.

Note that in practice the head driver 75 and the ink discharger 76 in FIG. 3 are provided respectively for the four printheads 9A to 9D constituting the printhead 9. As respective head drivers 75 have the same construction and the ink dischargers 76 have the same construction, FIG. 3 shows only one of the four printheads 9A to 9D for the purpose of simplicity of explanation. The printhead 9 has 64 print elements.

Further, the number of times the read-trigger signal is generated by the read-trigger generator 71 can be arbitrarily set.

Further, in addition to the above construction, the CPU 21 reads image signal DATA stored in the RAM 25, and inputs the image signal DATA into the head driver 75 via the data bus. In this embodiment, 64-bit image signal corresponding to the number of print elements is inputted. Each bit of the image signal is for one data for each print element.

Figure 4:
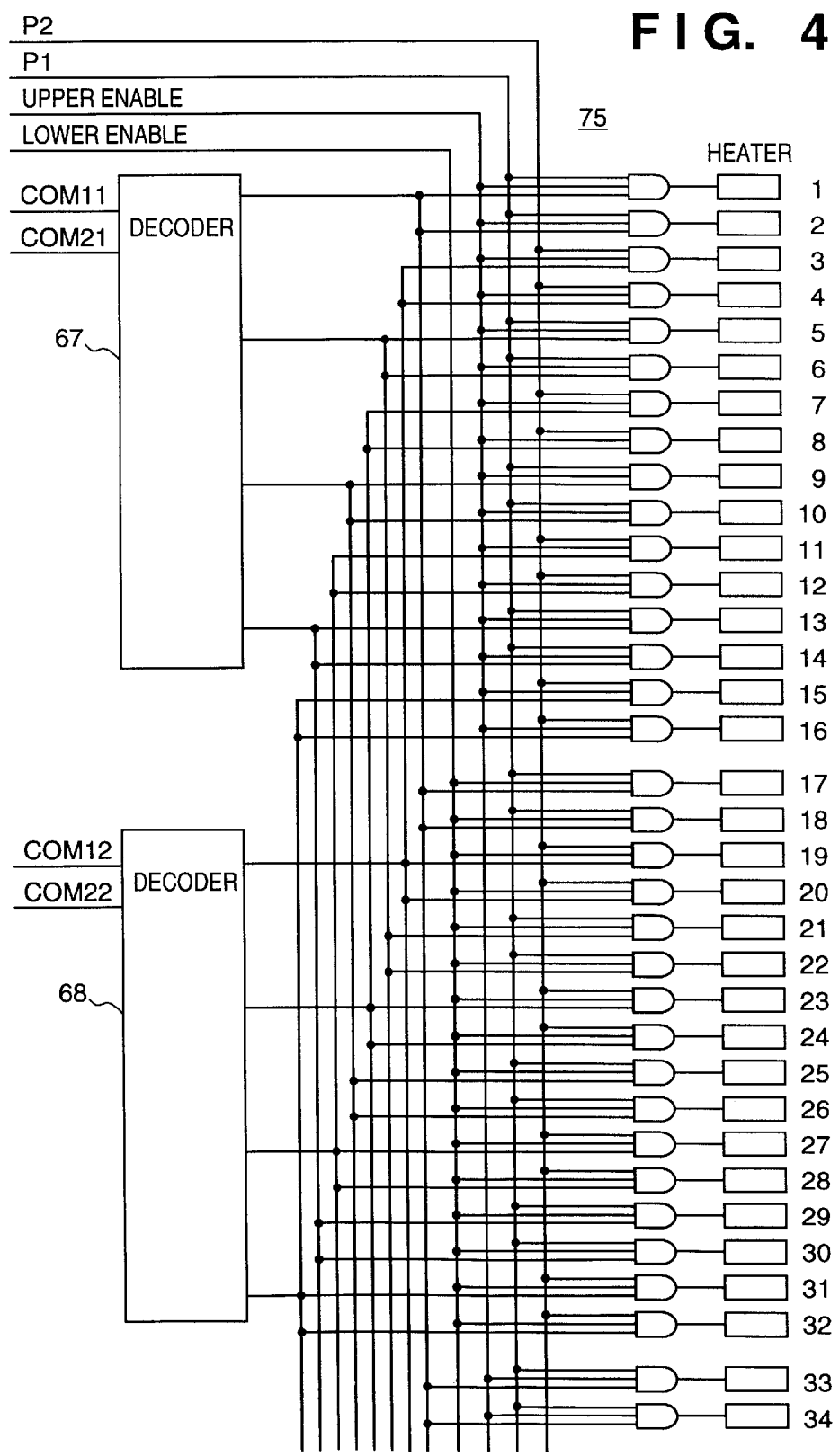
FIG. 4 is a block diagram showing the construction of a head driver 75.

FIG. 4 is a block diagram showing the construction of the head driver 75 of one printhead (i.e., one of the printheads 9A to 9D). This construction has 64 print elements per one printhead. FIG. 4 shows only heaters 1 to 34 among the 64 heaters and 64 ink-discharge nozzles (not shown) for 64 print elements. A logic circuit construction for the heaters 1 to 32 and that for the heaters 33 to 64 are the same.

As it is understood from FIG. 4, the heaters 1 to 16 and the heaters 33 to 48 are driven by application of the UPPER ENABLE signal via AND circuits provided corresponding to the respective heaters. On the other hand, the heaters 17 to 32 and 49 to 64 are driven by application of the LOWER ENABLE signal via AND circuits also provided corresponding to the respective heaters. Four signals obtained by decoding the control signals COM11 and COM21 by a decoder 67 are applied to the AND circuits corresponding to the heaters 1, 2, 17, 18, 33, 34, 49 and 50, the heaters 5, 6, 21, 22, 37, 38, 53 and 54, the heaters 9, 10, 25, 26, 41, 42, 57 and 58, and the heaters 13, 14, 29, 30, 45, 46, 61 and 62. On the other hand, four signals obtained by decoding the control signals COM12 and COM22 by a decoder 68 are applied to the AND circuits corresponding to the heaters 3, 4, 19, 20, 35, 36, 51 and 52, the heaters 7, 8, 23, 24, 39, 40, 55 and 56, the heaters 11, 12, 27, 28, 43, 44, 59 and 60, and the heaters 15, 16, 31, 32, 47, 48, 63 and 64.

Further, the pulse signal P1 is applied to the AND circuits corresponding to the heaters 1, 2, 5, 6, 9, 10, 13, 14, 17, 18, 21, 22, 25, 26, 29, 30, 33, 34, 37, 38, 41, 42, 45, 46, 49, 50, 53, 54, 57, 58, 61 and 62, while the pulse signal P2 is applied to the AND circuits corresponding to the heaters 3, 4, 7, 8, 11, 12, 15, 16, 19, 20, 23, 24, 27, 28, 31, 32, 35, 36, 39, 40, 43, 44, 47, 48, 51, 52, 55, 56, 59, 60, 63 and 64.

Although not shown in FIG. 4 for the purpose of simplicity of explanation, the respective bits of the 64-bit image signal DATA are inputted into the AND gates corresponding to the heaters 1 to 64.

Figure 5:
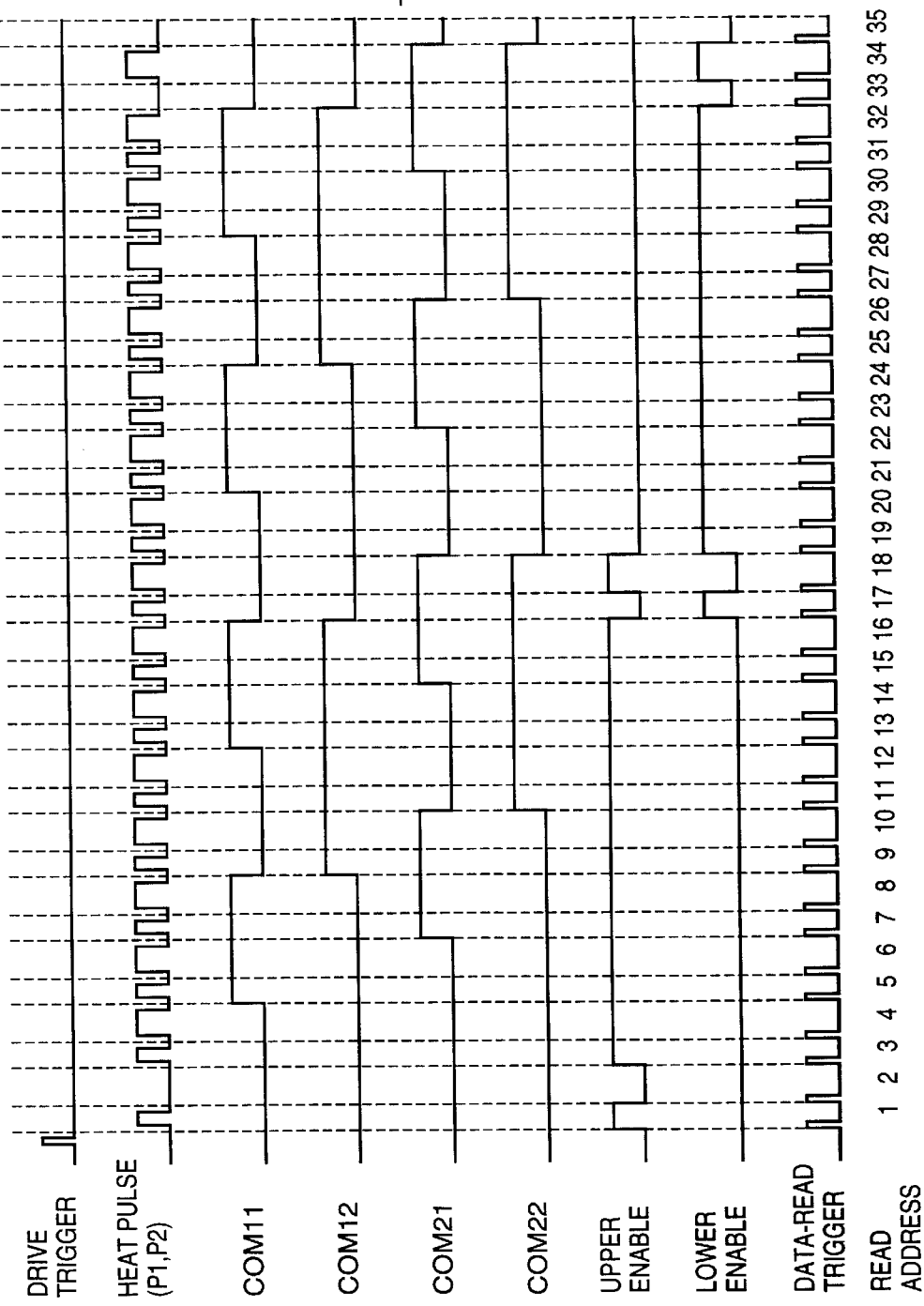
FIG. 5 is a timing chart showing an example of control signals applied to drive the head driver 75 having the construction in FIG. 4.

FIG. 5 is a timing chart showing an example of the control signals applied to drive the head driver 75 having the construction in FIG. 4. In a case where the status change of these signals are stored in the RAM 74 in the form of a data table, the contents of the data table are as shown in FIG. 6.

Figure 7:
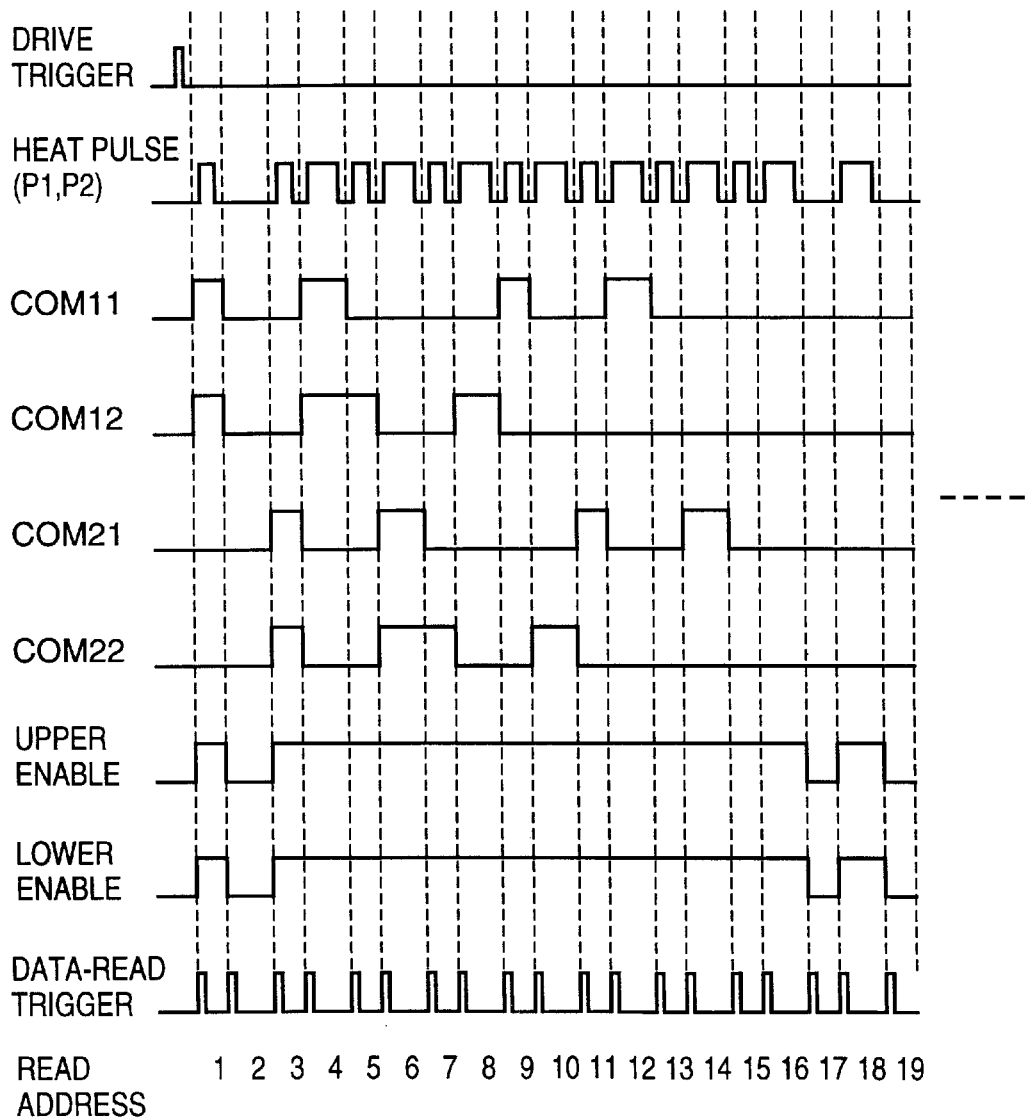
FIG. 7 is a timing chart showing another example of the control signals applied to drive the head driver 75.

As described above, the contents of the RAM 74 are rewritable. In a case where print control is performed by using a plurality of print-head drive patterns, the CPU 21 controls the address selector (SEL) 73 by a switching signal so as to access the RAM 74 by using the address signal AD2 supplied from the address bus, to rewrite the table contents with arbitrary data from an external device, by using the write signal and data supplied from the data bus. For example, if a control signal pattern for driving the head driver 75 as shown in FIG. 7 exists, the printheads are driven at timing as shown in FIG. 7 by rewriting the data table in the RAM 74 with values as shown in FIG. 8.

Figure 9:
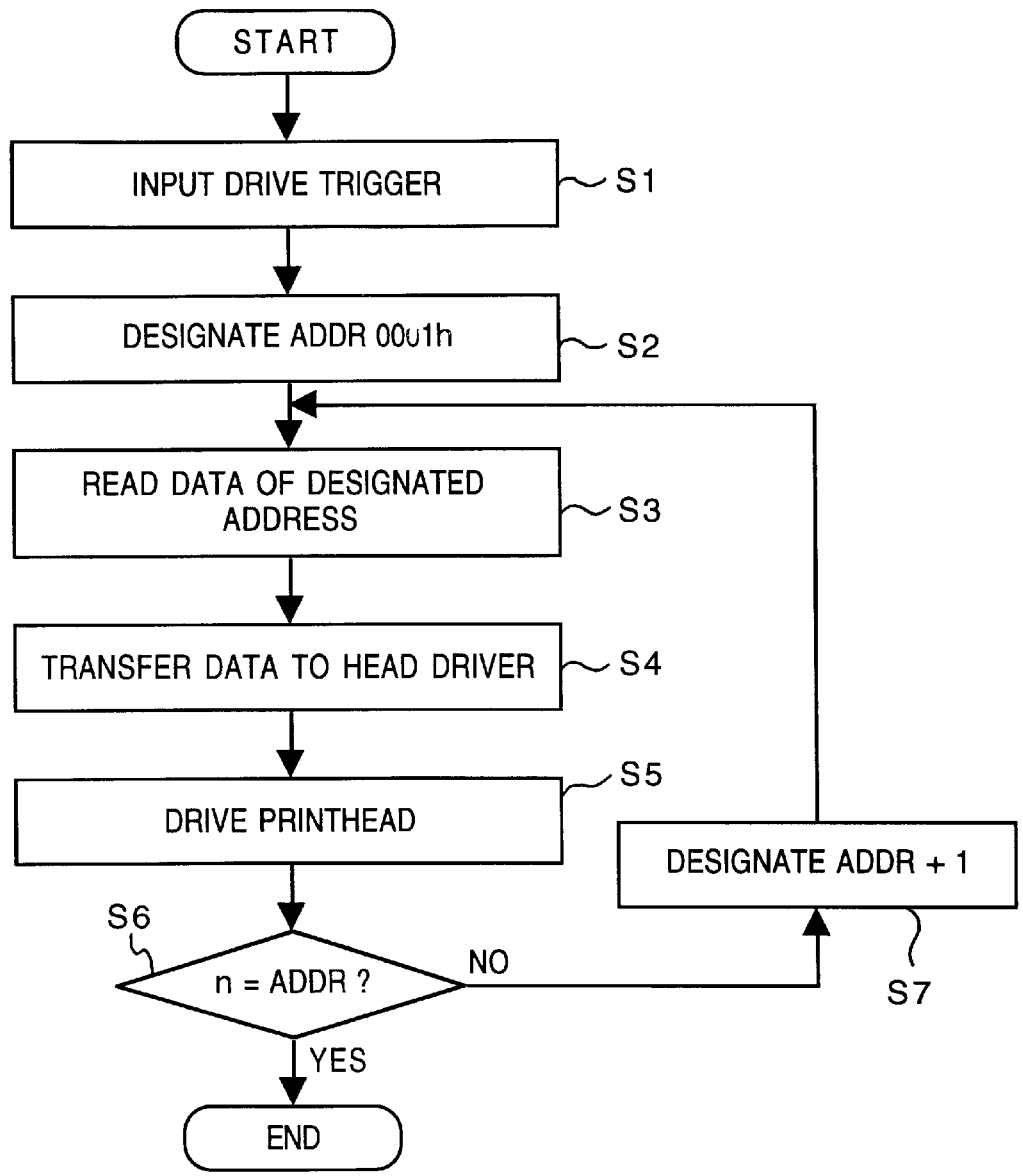
FIG. 9 is a flowchart showing print control in accordance with the data table stored in a RAM 74.
Figure 10:
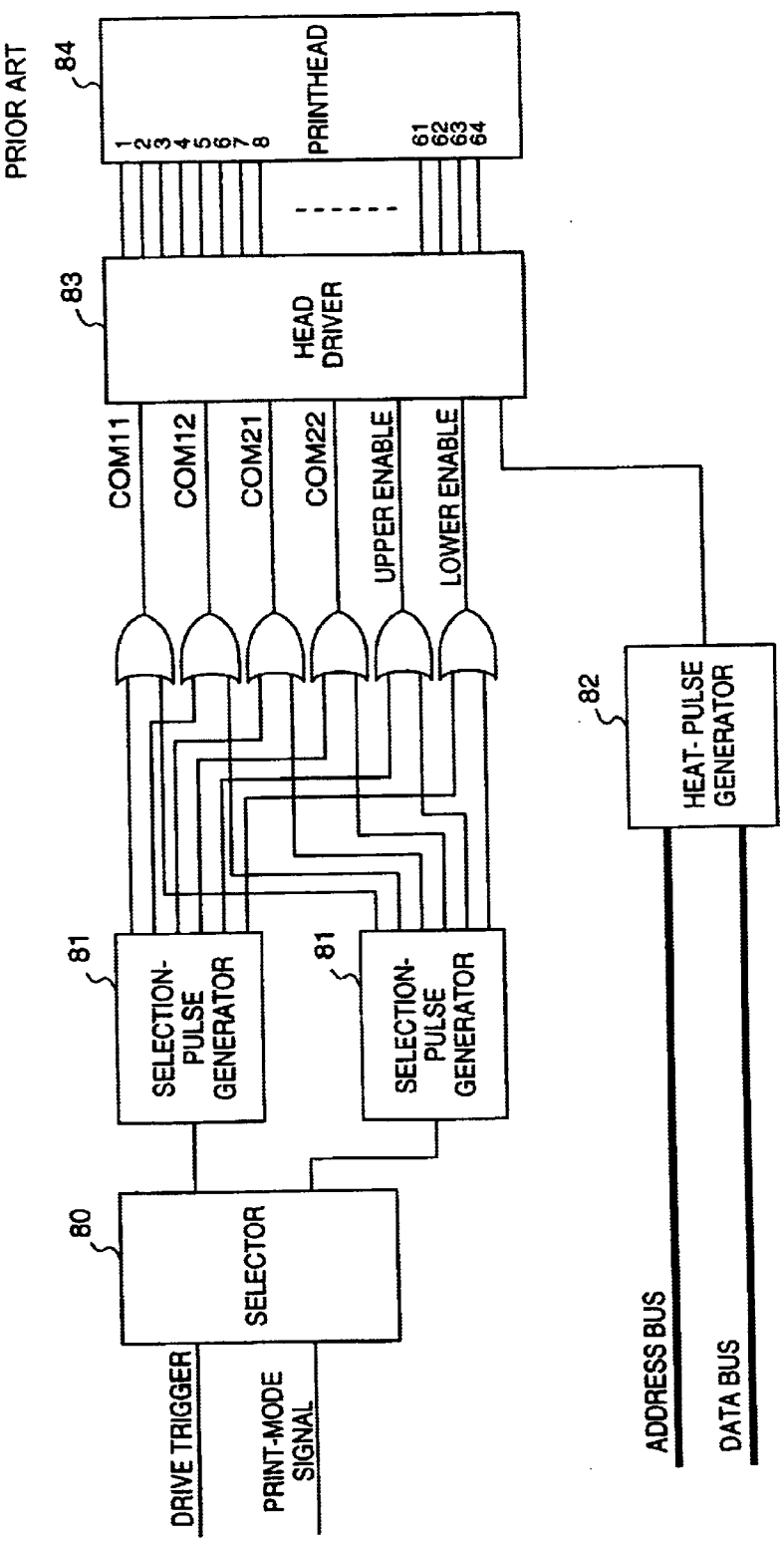
FIG. 10 is a block diagram showing the selection-pulse generators of the conventional printer having two print modes.

Next, print control for one cycle operation (print operation for all the 64 print elements) using the printer having the above construction will be described with reference to the flowchart of FIG. 9. The print control is performed based on a data table, as shown in FIG. 6 or FIG. 8, stored in the RAM 74. More specifically, in this print control, the address selector (SEL) 73 always supplies the address signal AD1 from the address generator 72 to the RAM 74.

At step S1, by the drive-trigger signal inputted from the CPU 21, the read-trigger generator 71 starts to supply the data-read trigger, and requires the address generator 72 to generate the address signal AD1. At step S2, the address generator 72 designates an address (ADDR=0001h (hexadecimal representation)) and supplies the address to the RAM 74 via the address selector (SEL) 73. At step S3, data at the designated address is read from the RAM 74. The address is a relative address to access the data table in the RAM 74, as shown in FIGS. 5 to 8.

Next, at step S4, the read data is transferred to the head driver 75. At step S5, the print elements are selectively driven by transferred control signals and the heat pulses supplied from the heat-pulse generator 77.

At step S6, the address (ADDR) is compared with the number n of head driving times per one cycle (n is determined in accordance with data table pattern). If ADDR=n holds, the one-cycle print operation is terminated. If ADDR<n holds, the process proceeds to step S7, at which the address generator 72 increments the value of the ADDR by one ("+1"), and supplies the ADDR value to the RAM 74 via the address selector (SEL) 73. Thereafter, the process returns to step S3. At this time, the read-trigger generator 71 supplies the data-read trigger to the RAM 74 in synchronization with the address generation by the address generator 72.

In this manner, the one-cycle print operation is performed by reading the table data from the RAM 74 until ADDR=n holds.

According to the above embodiment, print control can be performed in accordance with the pattern of table data stored in the RAM 74. As the contents of the table data in the RAM 74 can be easily rewritten by instruction from the CPU 21, the print control can be flexibly performed with a simple circuitry without constructing logic circuits corresponding to various print controls.

Note that in the above example, six signals (i.e., COM11, COM12, COM21, COM22, UPPER ENABLE AND LOWER ENABLE) are used for print control, however, the present invention is not limited to these signals. For example, the number of control signals can be increased by changing the structure of the data table in the RAM 74 or changing the type of data supplied from the data bus.

The embodiment described above has exemplified a printer, which comprises means (e.g., an electrothermal transducer, laser beam generator, and the like) for generating heat energy as energy utilized upon execution of ink discharge, and causes a change in the state of an ink by the heat energy, among the ink-jet printers. According to this ink-jet printer and printing method, a high-density, high-precision printing operation can be attained.

As the typical arrangement and principle of the ink-jet printing system, one practiced by use of the basic principle disclosed in, for example, U.S. Pat. Nos. 4,723,129 and 4,740,796 is preferable. The above system is applicable to either one of the so-called on-demand type or a continuous type. Particularly, in the case of the on-demand type, the system is effective because, by applying at least one driving signal, which corresponds to printing information and gives a rapid temperature rise exceeding film boiling, to each of electrothermal transducers arranged in correspondence with a sheet or liquid channels holding a liquid (ink), heat energy is generated by the electrothermal transducer to effect film boiling on the heat acting surface of the printhead, and consequently, a bubble can be formed in the liquid (ink) in one-to-one correspondence with the driving signal. By discharging the liquid (ink) through a discharge opening by growth and shrinkage of the bubble, at least one droplet is formed. If the driving signal is applied as a pulse signal, the growth and shrinkage of the bubble can be attained instantly and adequately to achieve discharge of the liquid (ink) with the particularly high response characteristics.

As the pulse driving signal, signals disclosed in U.S. Pat. Nos. 4,463,359 and 4,345,262 are suitable. Note that further excellent printing can be performed by using the conditions described in U.S. Pat. No. 4,313,124 of the invention which relates to the temperature rise rate of the heat acting surface.

As an arrangement of the printhead, in addition to the arrangement as a combination of discharge nozzles, liquid channels, and electrothermal transducers (linear liquid channels or right angle liquid channels) as disclosed in the above specifications, the arrangement using U.S. Pat. Nos. 4,558,333 and 4,459,600, which disclose the arrangement having a heat acting portion arranged in a flexed region is also included in the present invention. In addition, the present invention can be effectively applied to an arrangement based on Japanese Patent Laid-Open No. 59-123670 which discloses the arrangement using a slot common to a plurality of electrothermal transducers as a discharge portion of the electrothermal transducers, or Japanese Patent Laid-Open No. 59-138461 which discloses the arrangement having an opening for absorbing a pressure wave of heat energy in correspondence with a discharge portion.

Furthermore, as a full line type printhead having a length corresponding to the width of a maximum printing medium which can be printed by the printer, either the arrangement which satisfies the full-line length by combining a plurality of printheads as disclosed in the above specification or the arrangement as a single printhead obtained by forming printheads integrally can be used.

In addition, an exchangeable chip type printhead which can be electrically connected to the apparatus main unit and can receive an ink from the apparatus main unit upon being mounted on the apparatus main unit or a cartridge type printhead in which an ink tank is integrally arranged on the printhead itself can be applicable to the present invention.

It is preferable to add recovery means for the printhead, preliminary auxiliary means, and the like provided as an arrangement of the printer of the present invention since the printing operation can be further stabilized. Examples of such means include, for the printhead, capping means, cleaning means, pressurization or suction means, and preliminary heating means using electrothermal transducers, another heating element, or a combination thereof. It is also effective for stable printing to provide a preliminary discharge mode which performs discharge independently of printing.

Furthermore, as a printing mode of the printer, not only a printing node using only a primary color such as black or the like, but also at least one of a multi-color mode using a plurality of different colors or a full-color mode achieved by color mixing can be implemented in the printer either by using an integrated printhead or by combining a plurality of printheads.

Moreover, in each of the above-mentioned embodiments of the present invention, it is assumed that the ink is a liquid. Alternatively, the present invention may employ an ink which is solid at room temperature or less and softens or liquefies at room temperature, or an ink which liquefies upon application of a use printing signal, since it is a general practice to perform temperature control of the ink itself within a range from 30° C. to 70° C. in the ink-jet system, so that the ink viscosity can fall within a stable discharge range.

In addition, in order to prevent a temperature rise caused by heat energy by positively utilizing it as energy for causing a change in state of the ink from a solid state to a liquid state, or to prevent evaporation of the ink, an ink which is solid in a non-use state and liquefies upon heating may be used. In any case, an ink which liquefies upon application of heat energy according to a printing signal and is discharged in a liquid state, an ink which begins to solidify when it reaches a printing medium, or the like, is applicable to the present invention. In this case, an ink may be situated opposite electrothermal transducers while being held in a liquid or solid state in recess portions of a porous sheet or through holes, as described in Japanese Patent Laid-Open No. 54-56847 or 60-71260. In the present invention, the above-mentioned film boiling system is most effective for the above-mentioned inks.

In addition, the ink-jet printer of the present invention may be used in the form of a copying machine combined with a reader, and the like, or a facsimile apparatus having a transmission/reception function in addition to an image output terminal of an information processing equipment such as a computer.

The present invention can be applied to a system constituted by a plurality of devices or to an apparatus comprising a single device. Furthermore, the invention is also applicable to a case where the invention is embodied by supplying a program to a system or apparatus. In this case, a storage medium, storing a program according to the invention, constitutes the invention. The system or apparatus installed with the program read from the medium realizes the functions according to the invention.

As many apparently widely different embodiments of the present invention can be made without departing from the spirit and scope thereof, it is to be understood that the invention is not limited to the specific embodiments thereof except as defined in the appended claims.

What is claimed is:

1. A printing apparatus for printing an image on a printing medium by using a printhead including a plurality of print elements, comprising:

input means for inputting print data;

selection means for time-divisionally selecting drivable print elements from said plurality of print elements;

first memory means for storing plural sets of print operation control patterns used for specifying a timing for selecting drivable print elements by said selection means;

second memory means for storing one set of the plural sets of print operation control patterns;

rewriting means for rewriting the one set of print operation control patterns stored in said second memory means with a new one set of print operation control patterns selected from the plural sets of print operation control patterns stored in said first memory means;

timing signal output control means for outputting a timing signal for time-divisionally driving print elements in accordance with the set of print operation control patterns stored in said second memory means; and print means for performing printing by time-divisionally driving the drivable print elements selected by said selection means based on the print data inputted by said input means and the timing signal outputted by said timing signal output control means, wherein a time-divisional drive sequence of print elements is changed by rewriting the one set of print operation control patterns.

2. The printing apparatus according to claim 1, wherein said second memory means includes a RAM.

3. The printing apparatus according to claim 1, wherein the set of print operation control patterns is stored in said second memory means in the form of a table.

4. The printing apparatus according to claim 1, further comprising trigger signal control means for issuing a trigger signal to start a print operation.

5. The printing apparatus according to claim 4, further comprising:

first address-generation means for generating the address of said second memory means in which the set of print operation control patterns is stored, upon inputting the trigger signal; and second address-generation means for generating a read trigger signal for reading the set of print operation control patterns from said second memory means.

6. The printing apparatus according to claim 5, wherein said first address-generation means generates a head address of the set of print operation control patterns upon inputting the trigger signal, and then increments the head address by one in synchronization with generation of the read trigger signal.

7. The printing apparatus according to claim 6, further comprising reset means for resetting the address if the set of print operation control patterns has been sequentially read and the print operation corresponding to all the plurality of print elements has been completed.

8. The printing apparatus according to claim 1, wherein said printhead is an ink-jet printhead which performs printing by discharging ink.

9. The printing apparatus according to claim 1, wherein said printhead is a printhead which discharges ink by utilizing thermal energy and which comprises thermal-energy generators for generating thermal energy to be supplied to the ink.

10. The printing apparatus according to claim 1, wherein said printhead is a printhead for performing color printing.

11. The printing apparatus according to claim 10, wherein said printhead includes:

a first printhead unit for discharging yellow ink;
a second printhead unit for discharging cyan ink;
a third printhead unit for discharging magenta ink; and
a fourth printhead unit for discharging black ink.

12. The printing apparatus according to claim 1, wherein the print operation control patterns are patterns, each specifying a drive sequence of print elements.

13. The printing apparatus according to claim 1, wherein the timing signal contains plural signals which together specify a block including one or more print elements to be driven.

14. A print control method of controlling a print operation to print an image on a print medium by using a printhead including a plurality of print elements and plural sets of print operation control patterns stored in a first storage medium, comprising:

an input step of inputting print data;

a rewriting step of rewriting one set of print operation control patterns, used for selecting print elements, stored in a second storage medium with a new one set of print operation control patterns selected from the plural sets of print operation control patterns stored in the first storage medium;

a reading step of reading the stored set of print operation control patterns from the second storage medium, and outputting a timing signal for time-divisionally driving print elements in accordance with the read set of print operation control patterns;

a selection step of time-divisionally selecting drivable print elements from the plurality of print elements, based on the outputted timing signal; and a printing step of printing by time-divisionally driving the selected print elements using the inputted print data, wherein a time-divisional drive sequence of print elements is changed by rewriting the one set of print operation control patterns in said rewriting step.

15. The print control method according to claim 14, wherein a RAM is used as the second storage medium.

16. The method according to 14, wherein the print operation control patterns are patterns, each specifying a drive sequence of print elements.

17. The method according to claim 14, wherein the timing signal contains plural signals which together specify a block including one or more print elements to be driven.

18. A printing apparatus for printing an image on a printing medium by using a printhead including a plurality of print elements, comprising:

input means for inputting print data;

selection means for time-divisionally selecting drivable print elements from the plurality of print elements;

memory means for storing a set of print operation control patterns;

rewriting means for rewriting the set of print operation control patterns stored in said memory means with a new set of print operation control patterns;

timing signal output control means for outputting a timing signal for time-divisionally driving print elements in accordance with the set of print operation control patterns stored in said memory means; and print means for performing printing by time-divisionally driving the drivable print elements selected by said selection means based on the print data inputted by said input means and the timing signal outputted by said timing signal output control means, wherein a time-divisional drive sequence of print elements is changed by rewriting the one set of print operation control patterns.

19. The printing apparatus according to claim 18, wherein the print operation control patterns are patterns, each specifying a drive sequence of print elements.

20. The printing apparatus according to claim 18, wherein the timing signal contains plural signals which together specify a block including one or more print elements to be driven.

21. The printing apparatus according to claim 18, further comprising means for periodically outputting each address of the print operation control patterns stored in said memory means in response to a trigger signal.

22. A print control method of controlling a print operation to print an image on a print medium by using a printhead including a plurality of print elements and a set of print operation control patterns stored in a storage medium, comprising:

an input step of inputting print data;

a rewriting step of rewriting the set of print operation control patterns stored in the storage medium with a new one set of print operation control patterns;

a reading step of reading the stored set of print operation control patterns from the storage medium, and outputting a timing signal for time-divisionally driving print elements in accordance with the read set of print operation control patterns;

a selection step of time-divisionally selecting drivable print elements from the plurality of print elements, based on the outputted timing signal; and a printing step of printing by time-divisionally driving the selected drivable print elements using the inputted print data, wherein a time-divisional drive sequence of print elements is changed by rewriting the one set of print operation control patterns in said rewriting step.

23. The method according to claim 22, wherein print operation control patterns are patterns, each specifying a drive sequence of print elements.

24. The method according to claim 22, wherein the timing signal contains plural signals which together specify a block including one or more print elements to be driven.

25. The method according to claim 22, further comprising a step of periodically outputting each address of the print operation control patterns stored in the storage medium in response to a trigger signal.

* * * * *